US012667891B2

(12) United States Patent
Sanders et al.

(10) Patent No.: US 12,667,891 B2
(45) Date of Patent: Jun. 30, 2026

(54) LASER-BASED MANUFACTURING PROCESSES AND APPARATUSES

(71) Applicant: Wisconsin Alumni Research Foundation, Madison, WI (US)

(72) Inventors: Scott Sanders, Madison, WI (US); Lianyi Chen, Middleton, WI (US); Matthias Beuting, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 385 days.

(21) Appl. No.: 18/231,066

(22) Filed: Aug. 7, 2023

(65) Prior Publication Data

US 2025/0050419 A1     Feb. 13, 2025

(51) Int. Cl.
| | |
|---|---|
| *B22F 10/38* | (2021.01) |
| *B22F 10/28* | (2021.01) |
| *B22F 10/36* | (2021.01) |
| *B22F 10/85* | (2021.01) |
| *B22F 12/41* | (2021.01) |

(Continued)

(52) U.S. Cl.
CPC .............. *B22F 10/38* (2021.01); *B22F 10/28* (2021.01); *B22F 10/36* (2021.01); *B22F 10/85* (2021.01); *B22F 12/41* (2021.01); *B22F 12/90* (2021.01); *B33Y 10/00* (2014.12); *B33Y 30/00* (2014.12); *B33Y 50/02* (2014.12); *B22F 2998/00* (2013.01)

(58) Field of Classification Search
CPC .......... B22F 10/38; B22F 10/28; B22F 10/36; B22F 10/85; B22F 12/41; B22F 12/90;

B22F 2998/00; B22F 10/25; B22F 12/44; B22F 2999/00; B22F 2203/03; B33Y 10/00; B33Y 30/00; B33Y 50/02; B23K 2103/10; B23K 26/03; B23K 26/032; B23K 26/034; B23K 26/34; B23K 26/342
See application file for complete search history.

(56) References Cited

U.S. PATENT DOCUMENTS

| | | | |
|---|---|---|---|
| 2016/0236279 A1* | 8/2016 | Ashton | ................. B29C 64/153 |
| 2017/0120337 A1* | 5/2017 | Kanko | ............... B23K 15/0013 |

(Continued)

OTHER PUBLICATIONS

Wang, Z., et al., "Toward single-ended absorption spectroscopy probes based on backscattering from rough surfaces: H2O vapor measurements near 1350 nm.", Applied Physics B: Lasers and Optics, 121(2), 187-192. https://doi.org/10.1007/s00340-015-6216-8 , 2015.

(Continued)

*Primary Examiner* — Rebecca Janssen
(74) *Attorney, Agent, or Firm* — Mueting Raasch Group

(57)     ABSTRACT

Aspects of the disclosure are directed to assessing characteristics of a target from which a vapor plume is generated. As may be implemented with various embodiments, energy (e.g., laser light, an electron beam) is applied to a target and a vapor plume is created therefrom. An interrogation laser is applied toward the target via the vapor plume, and backscattered light from the interrogation laser is detected. The backscattered light is used to detect absorption characteristics of the vapor plume. Energy is further applied to the target, in which the applied energy is adjusted based on the absorption characteristics. Such approaches facilitate the application of energy to a target for a variety of uses.

20 Claims, 3 Drawing Sheets

Build area

(51) Int. Cl.
  *B22F 12/90*   (2021.01)
  *B33Y 10/00*   (2015.01)
  *B33Y 30/00*   (2015.01)
  *B33Y 50/02*   (2015.01)

(56)      References Cited

U.S. PATENT DOCUMENTS

| | | | |
|---|---|---|---|
| 2018/0178285 A1* | 6/2018 | Martin | B29C 64/268 |
| 2019/0039308 A1 | 2/2019 | Bechmann et al. | |
| 2021/0069831 A1 | 3/2021 | Choi et al. | |

OTHER PUBLICATIONS

Wang, Z., et al., "Spatially resolved concentration measurements based on backscatter absorption spectroscopy", Applied Physics B, 122(6). https://doi.org/10.1007/s00340-016-6451-7 , 2016.

Peng, W. Y., et al., "Single-ended mid-infrared laser-absorption sensor for simultaneous in situ measurements of H2O, CO2, CO, and temperature in combustion flows", Applied Optics, 55(33), 9347. https://doi.org/10.1364/ao.55.009347 , 2016.

Melin, S. T., et al., "Single-ended retroreflection sensors for absorption spectroscopy in high-temperature environments", Applied Physics B: Lasers and Optics, 123(4). https://doi.org/10.1007/s00340-017-6687-x , 2017.

Zhou, Y., et al., "Compact, fiber-coupled, single-ended laser-absorption-spectroscopy sensors for high-temperature environments", Applied Optics, 57(25), 7117. https://doi.org/10.1364/ao.57.007117, 2018.

Beuting, Matthias, et al., "Time-resolved absorption spectroscopy in electron beam melting with blue vertical-cavity surface-emitting lasers", Optics Express 17268, vol. 31, No. 11 / May 22, 2023.

ISA/US, PCT/US2024/035208, PCT Search Report and Written Opinion mailed Sep. 17, 2024, Shane Thomas (7 pgs).

\* cited by examiner

200

Detector
260

Interrogation laser
240

250

Parabolic mirror with central hole

Laser
210

Processing Circuit
270

Dichroic mirror
220

230

Build area
205

LASER-BASED MANUFACTURING PROCESSES AND APPARATUSES

STATEMENT REGARDING FEDERALLY SPONSORED RESEARCH AND DEVELOPMENT

This invention was made with government support under 70NANB21H039 awarded by the National Institute of Standards and Technology. The government has certain rights in the invention.

BACKGROUND

A variety of approaches involve applying energy such as a laser or electron beam to a target, in which a vapor plume is created from the target. The amount of energy and manner in which the energy is applied can affect the result at the target. For instance, where metal powder is being melted, characteristics of the melt such as composition, temperature, and pressure may vary and affect a result (e.g., a part being formed during fabrication from the metal powder). Certain on-machine diagnostics may have limited capability to predict part quality, and do not provide information about alloy composition. Certain optical approaches lack the time resolution needed to measure the highly dynamic nature of plume and melt pool oscillations (several kilohertz). Accordingly, it can be challenging to monitor the process in real time and, therefore, challenging to make proper adjustments to the application of energy during the process.

These and other matters have presented challenges to laser processes in which material is melted or ablated, for a variety of applications.

SUMMARY

Various example embodiments are directed to assessing aspects of material to which energy is applied and in which a vapor plume is therein created from the material. An interrogation laser is applied to the material and light backscattered therefrom is detected and used to assess the material to which the energy is applied, as well as the effect of the applied energy.

Approaches such as this may be utilized in a variety of environments, such as in fabrication methods in which energy is delivered to a substrate and creates vapor. Such approaches may involve laser powder bed fusion, electron-beam powder bed fusion, processes like welding, cutting, etching, and ablation (e.g., where the energy source is a laser, an electron beam, an ion beam or a radiofrequency source). Other environments involve laser removal of a blemish from human skin in which the vapor plume is used to assess and adjust the application of the laser.

Another embodiment is directed to a method in which energy is applied to a target and therein creates a vapor plume from the target. An interrogation laser is applied toward the target via the vapor plume, and backscattered light from the interrogation laser is detected, the backscattered light being reflected from the target (e.g., from a melt pool via which the vapor plume evaporates). The backscattered light may represent portions of the interrogation laser light that is not absorbed by the vapor plume, either as the light passes through the plume and to the target or from the target toward a detector/sensor, and can thus be used to detect absorption characteristics of the vapor plume. The energy is further applied to the target by adjusting the applied energy based on the absorption characteristics.

Another embodiment is directed to an apparatus comprising an interrogation laser to direct laser light toward a target via a vapor plume generated from the target by an energy source, a laser light detector to detect backscattered light from the interrogation laser, the backscattered light being reflected from the target, and a processing circuit. The processing circuit is specially programmed to use the backscattered light to detect absorption characteristics of the vapor plume, and to generate an output that causes the energy source to further apply the energy to the target, including adjusting the applied energy based on the absorption characteristics.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
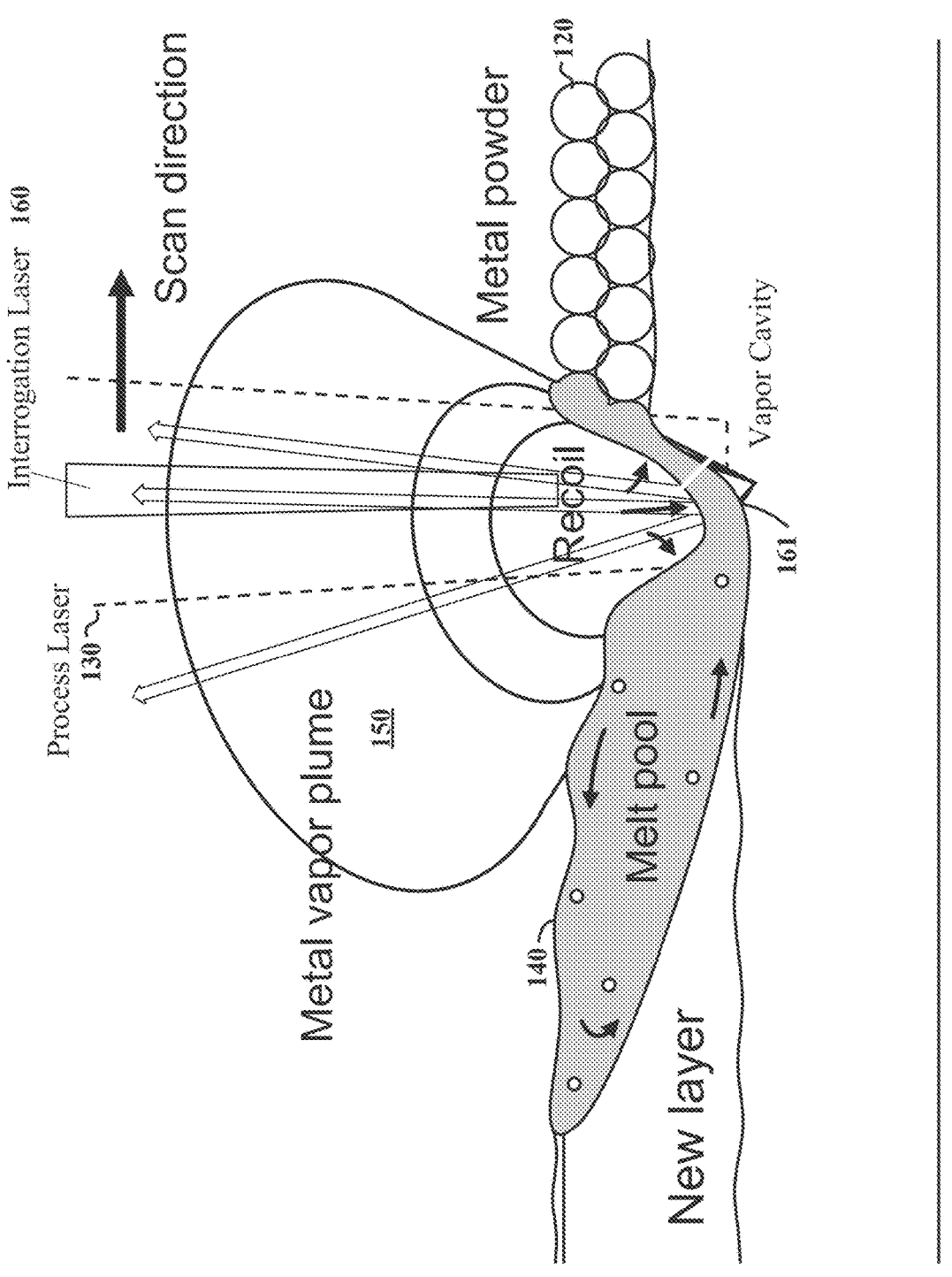
FIG. 1 shows a laser-based manufacturing approach, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving the application of energy such as a laser, to a target such as a metal powder, in which a vapor plume is generated from the target. The vapor plume is assessed by directing an interrogation laser into the plume and detecting backscattered portions thereof. These backscattered portions are then used to assess the state of the target and, therein, used to adjust the application of energy to the target.

One particular application involves 3D printing or laser welding. During 3D printing (or laser welding) of metals, a part of the processed material evaporates. In connection with various embodiments herein, it has been recognized/discovered that the properties of a hot metal vapor plume that evaporates during the process can be predictive of the print quality. For example, the plume composition is indicative of the rate of which individual alloying elements leave the melt pool and, therefore, of the composition of the final part. The plume pressure may also be detected, as the pressure creates a recoil effect responsible for melt-pool surface oscillation and pore formation. Further, the plume temperature is likely related to local evaporation rate.

The plume may include atomic metal vapor, and atoms in the vapor absorb light at discrete wavelengths. A sensor that uses wavelength-swept lasers tuned across absorption features of the elements in the metal vapor plume can be used to detect backscattered light. A plot of the detected backscattered light provides line shapes that are influenced by environmental parameters: the line strength depends on temperature, the line width depends on temperature and pressure, and the integrated absorbance depends on the concentration of the observed species. The parameters mentioned above are encoded in the observed absorption signal (e.g., in which certain wavelengths of the wavelength-swept lasers are absorbed), which may then be used to ascertain related characteristics and adjust the applied laser.

Data acquisition from the backscattered light can be in the high kilohertz range, and can provide live processing that may be utilized to adjust a process in-line. Further, with machine-learning based live processing, laser-based manufacturing can be adjusted to effect quality control and reduce the need for destructive or expensive non-destructive testing of a final product. Furthermore, optimal settings may be determined for new alloys or raw material qualities.

In accordance with various embodiments, co-axial sensors are mounted in a process laser light path of commercial 3D printers or welders without influencing print quality or needing to modify the machine. Similarly, an interrogation laser may utilized the same path as a process laser used to create the vapor plume. However, a variety of arrangements may be used, for example in which the process source comes in vertically from above, and an interrogation laser comes in separately 15 degrees from vertical. The backscattered signal detector may be co-located with interrogation laser or in a third position such as 30 degrees from vertical. Further, a variety of light-conducting mediums may be used, such as fiber optics.

Another embodiment is directed to a method in which energy (e.g., a process laser) is applied to a target and creates a vapor plume from the target. Such an environment may involve 3D printing in which the laser is directed to a metal powder (and melts the powder), or laser welding. An interrogation laser is applied toward the vapor plume, and light from the interrogation laser that is backscattered from the target is detected. This backscattered light may be used to detect characteristics of the vapor plume, such as absorption characteristics, temperature, pressure or others. The energy is further applied to the target by adjusting the applied energy based on the absorption characteristics. Accordingly, the energy application can be adjusted in real time based on characteristics of the vapor plume.

In some embodiments, the interrogation laser applies laser light having multiple wavelengths (e.g., using wavelength-swept lasers tuned across absorption features of elements in the vapor plume). Backscattered portions of the respective wavelengths are detected and used to determine the absorption characteristics, based on the wavelength of light that is backscattered (and therein, may be based on the wavelength of light that is absorbed). For instance, as consistent with the recognition/discovery characterized herein, the characteristics may be determined based on an amount of the interrogation laser light that is absorbed at respective wavelengths. The absorption characteristics may be determined by assessing spectral lines and their indicated quantized energy levels as an indication of species and the plume environment.

Applying energy to the target may include using one or more energy sources, such as a laser, an electron-beam source, an ion-beam source, a radiofrequency source, a welding tool, a cutting tool, and a combination thereof. The interrogation laser, energy source, and backscattering detection may be applied in the same path as one another, may be applied in completely different paths for each, or two may share a path.

As noted above, the instant approach may be utilized in a variety of situations. For instance, laser powder bed applications in which a part is 3D manufactured may be modified by adding an interrogation laser and detector as noted herein. The target is thus a metal powder being used to form a printed part, and absorption characteristics of the vapor plume are indicative of print quality of the part as it is formed. For instance, the absorption characteristics may be indicative of a rate at which individual alloying elements of the metal powder leave a melt pool created by the energy source. Thus, this rate is an indication of the composition of the part, such that the energy source can be adjusted to set the composition of the part.

As noted above, the backscattered light may be used to detect various characteristics of the process. In certain embodiments, the backscattered light is used to detect pressure characteristics of the vapor plume, and the energy source is adjusted based on the detected pressure characteristics to achieve a desired result. In other embodiments, the backscattered light is used to detect temperature characteristics of the vapor plume, and the energy source is controlled based on the detected temperature characteristics. A combination of such approaches may also be utilized.

In some implementations, the backscattered light is detected over time as an absorption signal characterized in which the line strength is indicative of temperature, the line width is indicative of temperature and pressure, and the integrated absorbance is indicative of the concentration of species observed in the vapor plume.

Another embodiment is directed to an apparatus comprising an interrogation laser to direct laser light toward a target via a vapor plume generated from the target by an energy source, a laser light detector to detect backscattered light from the interrogation laser that is reflected from the target, and a processing circuit. The processing circuit is specially programmed to use the backscattered light to detect absorption characteristics of the vapor plume (e.g., to detect wavelengths of light that are absorbed in the vapor plume), and to generate an output that causes the energy source to further apply the energy to the target. This output adjusts the applied energy based on the absorption characteristics. For instance, such an output may increase or decrease laser power, sweep rate, frequency or other characteristics. The output may be based on an amount of the interrogation laser light that is absorbed at respective wavelengths.

In some embodiments the apparatus includes the energy source that applies the energy to the target and therein creates the vapor plume from the target. The energy source may include a laser, an electron-beam source, an ion-beam source, a radiofrequency source, a welding tool, a cutting tool, and a combination thereof.

In certain embodiments, the interrogation laser is configured to apply the laser light by applying laser light having multiple wavelengths. The laser light detector is configured to detect backscattered portions of the respective wavelengths. The processing circuit is configured to determine the absorption characteristics based on the wavelength of light that is backscattered.

The interrogation laser may be aligned to apply the interrogation laser light in a common path with process laser light applied via the energy source, or in a separate path. Similarly, the backscattered light may be collected from a common path or different path relative to one or both of the process laser light and the interrogation laser light.

The processing circuit may determine the absorption characteristics by assessing spectral lines and their indicated quantized energy levels as an indication of species and the vapor plume environment. The processing circuit may also be configured to generate the control output by generating an output that adjusts the amount of energy applied to the target.

In various embodiments, machine learning is used to monitor a process and adjust over time as results change under conditions. For instance, a training phase may be used to develop an algorithm, and then used in an implementation phase to provide real time feedback and/or provide instant feedback. Machine learning could be applied per part or per process. For example, by collecting thousands of data points per second in a training phase involving a small number of parts (e.g., 50 or 100 parts), the parts may be assessed and used to develop a model for providing feedback, and then used in process.

Turning now to the figures, FIG. 1 shows a laser-based manufacturing approach, as may be implemented in accordance with one or more embodiments. A part 110 is being formed using metal powder 120, by applying a process laser 130 to a target portion thereof. A melt pool 140 is generated, and a metal vapor plume 150 is created from the melt pool 140. An interrogation laser 160 is directed to the metal vapor plume 150, and certain portions 161 of the interrogation laser are backscattered (e.g., reflected from the melt pool 140), with other portions being absorbed by the metal vapor plume. This absorption may include one or both of absorption as the interrogation laser passes through the vapor plume prior to reflection from the melt pool, or absorption as the reflected interrogation laser passes through the vapor plume. These backscattered reflections are assessed to identify various characteristics of the melt pool and the target portion (e.g., a part formed) as the melt pool solidifies.

While the approach shown in FIG. 1 involves metal part fabrication, the application of the interrogation laser in related situations such as in electron beam melting, laser welding, or laser removal of tissue, may similarly be used to assess characteristics of the material being melted (or, e.g., ablated). In each of these embodiments, the identified characteristics can be used to adjust the application of the laser (or any energy source) being used, to modify the process as needed.

Figure 2:
FIG. 2 shows an apparatus for assessing characteristics of laser-based processing using backscattered light, as may be implemented in accordance with one or more embodiments.

FIG. 2 shows an apparatus 200 for assessing characteristics of laser-based processing using backscattered light, as may be implemented in accordance with one or more embodiments. The apparatus includes a process laser 210 that directs laser light through a dichroic mirror 220 and a lens 230 to a target 205, which may be a metal-based part, tissue, or other material. An interrogation laser 240 directs light via a parabolic mirror (with central hole) 250, as well as dichroic mirror 220 and lens 230 toward a plume generated at the target 205 by the process laser. Backscattered portions of the interrogation laser light are detected by detector 260, and data representing the detected light is provided to a processing circuit 270, which analyzes the data to ascertain characteristics of the process.

Absorption characteristics can be used in a variety of manners, to assess various aspects of a laser processing approach. For example, where certain types of materials absorb laser light at a particular wavelength and reflect other wavelengths, detecting that certain wavelengths are absorbed while others are not absorbed can be assessed and correlated to the material type, and utilized to assess the composition of the evaporated material (such as a metal plume evaporated from a melt pool). Based on the analysis, the processing circuit 270 generates an output that is sent to the process laser to control/adjust its application of laser light to the target 205. Using the above example, the process laser may be adjusted to increase or decrease the amount of correlated material type in the plume (and/or in the final product).

In some embodiments, the interrogation laser 240 may be coupled coaxially to the process laser. The backscattered light may also be collected through the same optical path after passing through the vapor plume. This configuration allows the detector 260 to be easily mounted to commercial 3D printers or laser welding machines.

Figure 3:
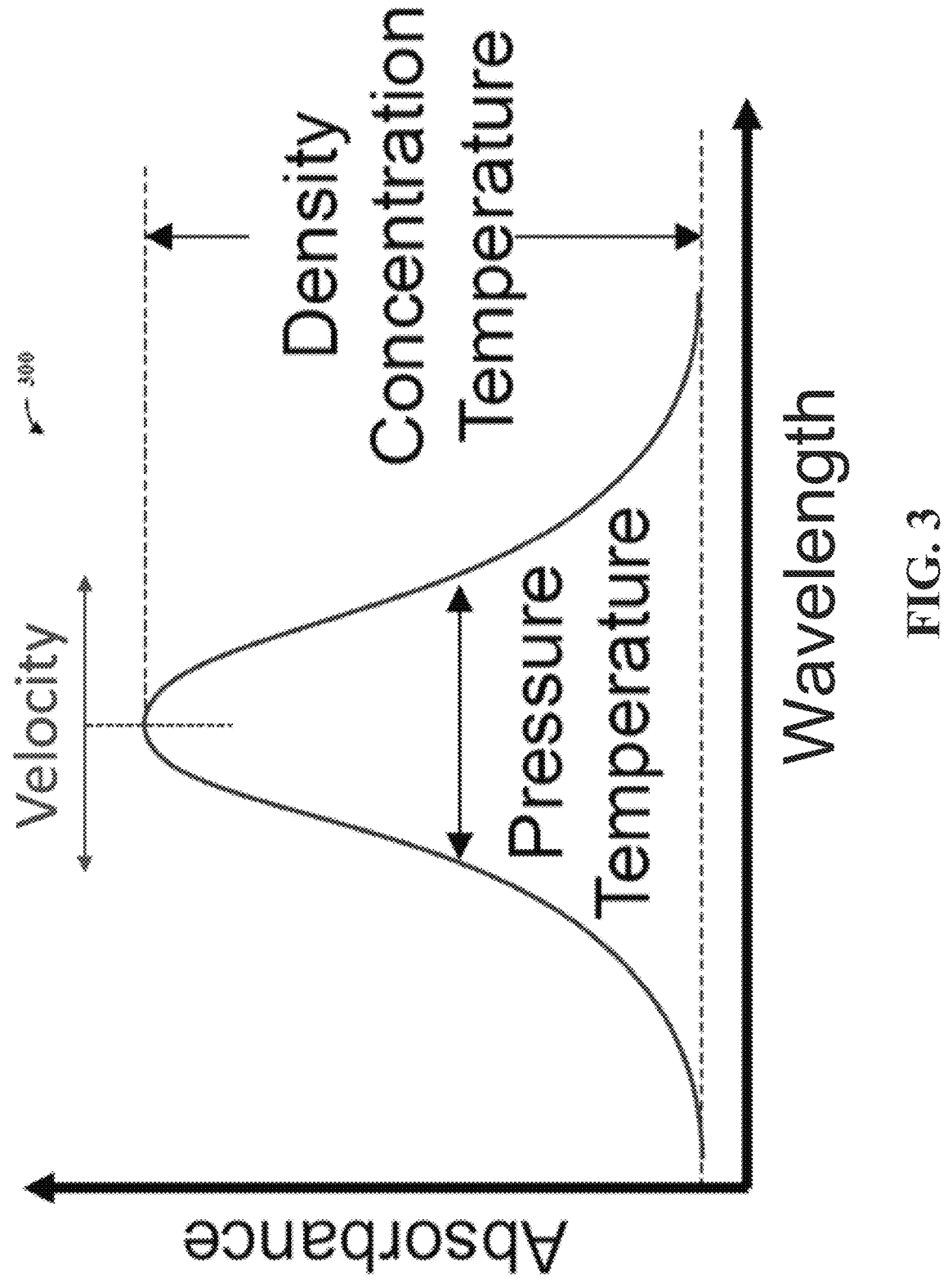
FIG. 3 shows a plot representing a signal detected from backscattered light as may be utilized in accordance with one or more example embodiments.

FIG. 3 shows a plot 300 representing a signal detected from backscattered light, as may be utilized in accordance with one or more example embodiments. For instance, such a plot may be assessed by processing circuit 270, to control process laser 210. Wavelength is shown on the horizontal axis, and absorbance is shown on the vertical axis. This plot may be obtained, for example, using a multi-wavelength interrogation laser that directs laser light of various wavelengths to a vapor plume. The plot may represent an absorption signal characterized in which the line strength is indicative of temperature, the line width is indicative of temperature and pressure, and the integrated absorbance is indicative of the concentration of species observed in the vapor plume. Velocity can change both the center wavelength and the line width.

Due to the Doppler effect, the flow velocity may change the center wavelength. In the main coaxial backscatter configuration, light may travel through the plume first against and then in the main direction of flow. Therefore, the absorption signal may be first blueshifted and then redshifted, resulting in additional line broadening with increasing temperature. This can be used to assess temperature. In other configurations, where the light to the detector takes a different path than the interrogation laser, this may result in an additional shift of the line center to the left or right.

In certain embodiments, the temperature, vapor density or pressure as obtained via analysis of backscattered light as noted herein, can be used for closed loop control. For example, if the measured temperature value is higher than a preset limit, the laser power can be tuned down to reduce temperature; if the measured temperature is lower than a preset limit, the laser power can be increased to increase temperature. This closed loop control enabled by the high-speed temperature, vapor density and pressure measurements as discussed herein, may facilitate consistent microstructure and properties across the whole part. Such control may be implemented, for example, in a feedback loop from the processing circuit 270 to the process laser 210 as shown in FIG. 2.

The measured temperature, vapor density or pressure can also be used to detect anomalies in the printing process, in accordance with one or more embodiments. For example, if the measured temperature is higher than a preset upper limit, this may be used to assess keyhole pore formation in the process; if the temperature is lower than a preset lower limit, this may indicate lack of fusion pore. The measured temperature, vapor density or pressure data can be used to construct a three-dimensional defect distribution map, which may provide a cost-effective way for part qualification and certification. Such an approach may also be carried out in the processing circuit 270, with special programming utilized to assess temperatures relative to predefined limits, and related outputs generated to provide an indication of the corresponding quality.

Based upon the above discussion and illustrations, those skilled in the art will readily recognize that various modifications and changes may be made to the various embodiments without strictly following the exemplary embodiments and applications illustrated and described herein. For example, a variety of different types of materials may be processed, in which an interrogation laser as noted herein is utilized to characterize the processed materials. In this context, embodiments referring to metal-based part manufacturing are applicable to welding, tissue (e.g., live) ablation/processing, and others. Further, a variety of optics and placements of the respective lasers and detectors may be used. In addition, embodiments characterized herein may be combined, such that aspects of one exemplified embodiment may be utilized with aspects of other embodiments. Such modifications do not depart from the true spirit and scope of various aspects of the invention, including aspects set forth in the claims.

What is claimed is:

1. A method comprising:
applying energy, from an energy source, to a target and therein creating a vapor plume from the target;
applying an interrogation laser toward the target via the vapor plume;
detecting backscattered light from the interrogation laser, the backscattered light representing the interrogation laser light with certain portions thereof being absorbed by the vapor plume;
using the backscattered light to detect absorption characteristics of the vapor plume; and
further applying the energy to the target, including adjusting the applied energy based on the absorption characteristics.

2. The method of claim 1, wherein applying the interrogation laser includes applying laser light having multiple wavelengths, and wherein detecting the backscattered light includes detecting backscattered portions of the respective wavelengths that are not absorbed by the vapor plume, and wherein detecting the absorption characteristics includes determining the absorption characteristics based on the wavelength of light that is backscattered.

3. The method of claim 1, wherein determining the absorption characteristics includes determining the characteristics based on an amount of the interrogation laser light that is absorbed at respective wavelengths.

4. The method of claim 1, wherein applying the interrogation laser includes applying the interrogation laser in the same path as the applied energy.

5. The method of claim 1, wherein applying energy to the target includes using an energy source selected from the group of: a laser, an electron-beam source, an ion-beam source, a radiofrequency source, a welding tool, a cutting tool, and a combination thereof.

6. The method of claim 1, wherein determining the absorption characteristics includes assessing spectral lines and their indicated quantized energy levels as an indication of species and the plume environment.

7. The method of claim 1, wherein the target is a metal powder being used to form a printed part, and wherein absorption characteristics of the vapor plume are indicative of print quality of the part as it is formed.

8. The method of claim 7, wherein:
the absorption characteristics are indicative of a rate at which individual alloying elements of the metal powder leave a melt pool created by the energy source and, therein, an indication of the composition of the part; and
adjusting the energy source includes adjusting the energy source to set the composition of the part.

9. The method of claim 1, wherein:
using the backscattered light includes detecting pressure characteristics of the vapor plume; and
further applying the energy source to the target includes adjusting the energy source based on the detected pressure characteristics.

10. The method of claim 1, wherein:
using the backscattered light includes detecting temperature characteristics of the vapor plume; and
further applying the energy source to the target includes adjusting the application of the energy source based on the detected temperature characteristics.

11. The method of claim 1, wherein using the backscattered light to detect absorption characteristics of the vapor plume includes detecting an absorption signal characterized by the backscattered light, in which the line strength is indicative of temperature, the line width is indicative of temperature and pressure, and the integrated absorbance is indicative of the concentration of species observed in the vapor plume.

12. The method of claim 1, wherein applying the interrogation laser includes using wavelength-swept lasers tuned across absorption features of elements in the vapor plume.

13. An apparatus comprising:
an interrogation laser to direct laser light toward a target via a vapor plume generated from the target by an energy source;
a laser light detector to detect backscattered light from the interrogation laser, the backscattered light representing the interrogation laser light with certain portions thereof being absorbed by the vapor plume; and
a processing circuit to use the backscattered light to detect absorption characteristics of the vapor plume; and to generate an output that causes the energy source to further apply the energy to the target, including adjusting the applied energy based on the absorption characteristics.

14. The apparatus of claim 13, further comprising an energy source that applies the energy to the target and therein creates the vapor plume from the target.

15. The apparatus of claim 14, wherein the energy source is selected from the group of: a laser, an electron-beam source, an ion-beam source, a radiofrequency source, a welding tool, a cutting tool, and a combination thereof.

16. The apparatus of claim 13, wherein:
the interrogation laser is configured to apply the laser light by applying laser light having multiple wavelengths;
the laser light detector is configured to detect backscattered portions of the respective wavelengths; and
the processing circuit is configured to determine the absorption characteristics based on the wavelength of light that is backscattered.

17. The apparatus of claim 13, wherein the process circuit is configured to determine the absorption characteristics based on an amount of the interrogation laser light that is absorbed at respective wavelengths.

18. The apparatus of claim 13, wherein the interrogation laser is aligned to apply the interrogation laser light in a common path with process laser light applied via the energy source.

19. The apparatus of claim 13, wherein the processing circuit is configured to determine the absorption characteristics by assessing spectral lines and their indicated quantized energy levels as an indication of species and the vapor plume environment.

20. The apparatus of claim 13, wherein the processing circuit is configured to generate the control output by generating an output that adjusts the amount of energy applied to the target.

* * * * *